United States Patent [19]
Derman

[11] Patent Number: 4,779,434
[45] Date of Patent: Oct. 25, 1988

[54] TAILGATE LOCKING DEVICE

[76] Inventor: Jay S. Derman, 4141 Dixie Canyon Ave., Sherman Oaks, Calif. 91423

[21] Appl. No.: 46,107

[22] Filed: May 5, 1987

[51] Int. Cl.[4] .......... F16B 41/00

[52] U.S. Cl. .......... 70/230; 70/232; 70/63; 70/163; 70/166; 70/167

[58] Field of Search .......... 70/32-34, 70/63, 158, 163, 166-169, 229-232

[56] References Cited

U.S. PATENT DOCUMENTS

| | | | |
|---|---|---|---|
| 3,245,239 | 4/1966 | Zaidener | 70/202 |
| 4,080,811 | 3/1978 | Nielsen, Jr. | 70/232 X |
| 4,107,959 | 8/1978 | Skarzynski et al. | 70/232 X |
| 4,120,182 | 10/1978 | Michelman | 70/63 |
| 4,144,729 | 3/1979 | Nielsen, Jr. | 70/63 |
| 4,414,829 | 11/1983 | Nielsen, Jr. et al. | 70/232 X |
| 4,551,999 | 11/1985 | Guiler | 70/63 X |

*Primary Examiner*—Robert L. Wolfe
*Assistant Examiner*—Suzanne L. Dino
*Attorney, Agent, or Firm*—Monty Koslover Assoc.

[57] ABSTRACT

A device for securing the tailgate of a pickup truck, so that it can not be removed by unauthorized persons. The device is made of three steel assemblies, one of which is fitted over a tailgate.extension, using the extension as an anchor for holding the device in place. A second assembly, acting as a clamp, is attached to the first by a fixed bolt and a nut. The clamp, presses on the side wall of the pickup truck, pulling the tailgate to it. Attached to the nut is a tube that holds a lock plug. When a lock plug is inserted in the tube, the nut can not be rotated and loosened. The lock plug is a cylinder lock, locked by a key and protected against weather by a plastic cap. In design, the locking device is massive, weatherproofed and although open to access, is not susceptible to cutting, breaking or damage such as sustained in unauthorized removal, without causing damage to paint finish of the tailgate which is being appropriated without the owner'permission, and has no resale value in less than 100% perfect condition.

8 Claims, 3 Drawing Sheets

TAILGATE LOCKING DEVICE

BACKGROUND OF THE INVENTION

Certain manufacturers of pickup trucks, have produced pickup trucks having tailgates that are easily removable from the truck. This was done as an advantage to the truck owner, to facilitate removal when the owner is in a hurry. The tailgate has had no lock securing it to the truck bed. Unfortunately, these tailgates have become a target for those who would steal the tailgates installed on trucks on the dealer's lots, as well as from private owners. There is therefore, a need for a locking device that will prevent such unauthorized removal of the tailgate, while at the same time being non-permanent, and easy for an authorized person to disassemble and remove.

Although many locking devices exist, most of these are designed to prevent unauthorized access to a locked box or enclosure. None are intended to prevent any unauthorized person from making off with the item the locking device is intended to secure. Heavy duty locking devices typically require drilling a bolt hole through the cover of the item that is to be secured. There can be no open access to the inside of the container, without unlocking the device, since the securing bolt could then be tampered with. This aspect is notable for example, in the designs of the locking devices of Guiler, U.S. Pat. No. 4,551,999, Nielsen Jr. et al., U.S. Pat. No. 4,414,829 and Michelman et al., U.S. Pat. No. 4,120,182. For an open, accessible location such as the inside surface of the truck tailgate, such an arrangement is clearly impermissible, because of the possibility of tampering with the securing bolt. Thus there is a need for a tailgate locking device that, while open to access, can not be easily tampered with.

SUMMARY OF THE INVENTION

The invention comprises three major metal steel parts or assemblies, a lock plug and a protective plastic cover to shield the end of the lock plug from weather. A bolt base assembly, shaped to fit the end of the tailgate, is fitted over a tailgate extension and a channel clamp is placed over the bolt base assembly with its bolt projecting through a hole in the channel clamp. A nut-alignment tube part is turned on to the bolt, causing the channel clamp to press tightly against the bolt base assembly and the inside of the truck wall. A lock plug is then pushed through the alignment tube and into the channel clamp. The lock plug is then turned by a key until its lock pin extends, preventing the lock plug from being pulled out. The nut-alignment tube is now locked in place, and can not be rotated off the bolt, thus securing the locking device in place. The device is massive, and made of steel parts of a size and thickness not generally susceptible to easy cutting, bending or breaking.

Accordingly, it is a principal object of this invention to provide a device that will securely lock a tailgate to a pickup truck, and prevent its unauthorized removal.

Another object is to provide an easily assembled device. It is another object to provide a locking device that, while open to access, can not be easily tampered with. It is yet another object to provide a device that will withstand an outdoor all-weather environment. Another object is to improve safety. The locking device will prevent cargo and people in the bed of the pickup from shifting out of the tailgate due to sudden turns or stops.

Further objects and advantages of the present invention will become apparent from the study of the following portion of the specification, the claims and the attached drawings.

DESCRIPTION OF THE PREFERRED EMBODIMENTS

Figure 1:
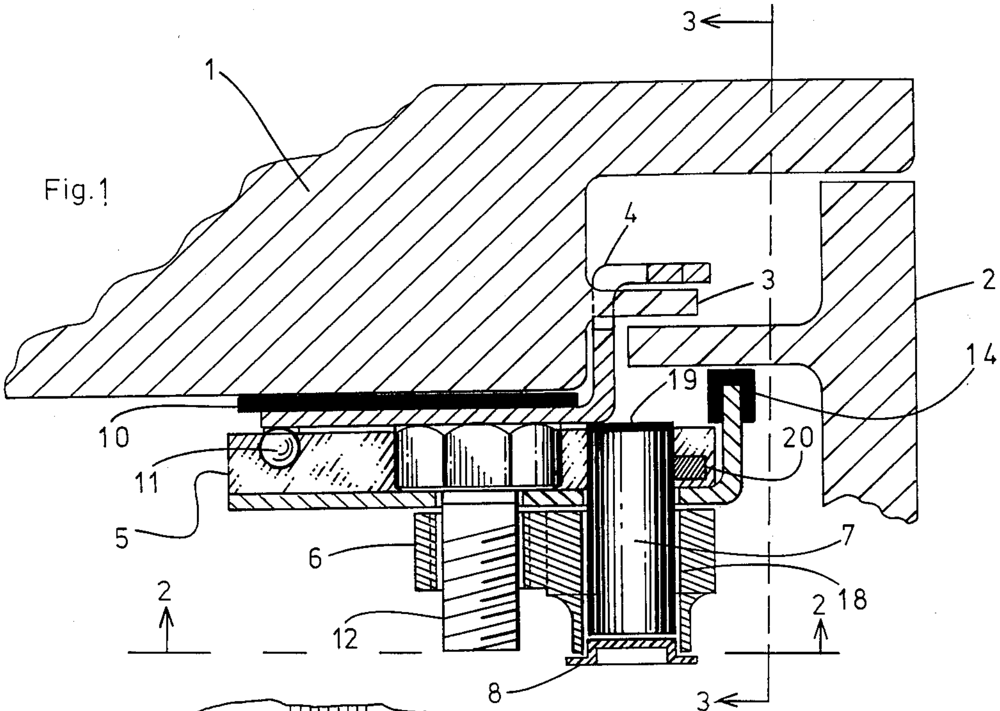
FIG. 1 is a top cross-section view of the present invention in place, locking the tailgate to the side wall of the pickup truck.
Figure 2:
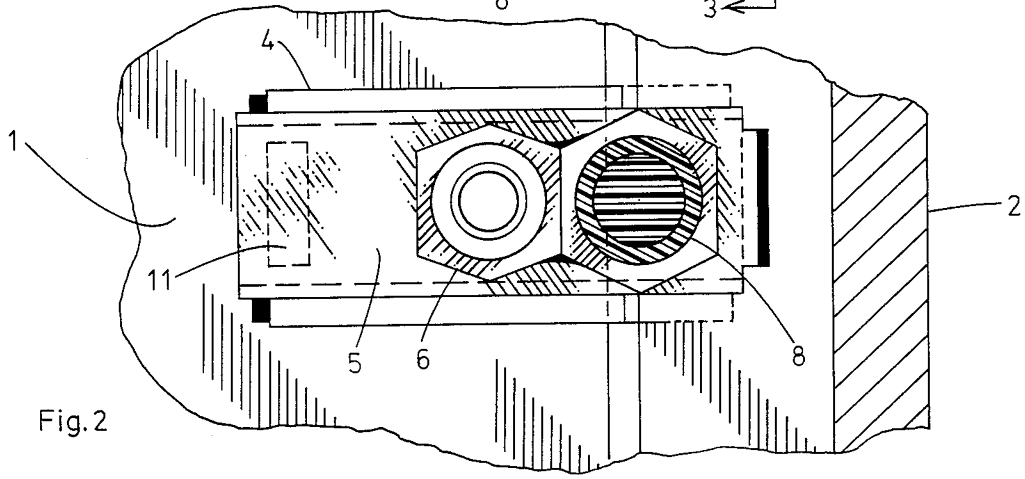
FIG. 2 is a front elevation view of the device locked in place, and taken along line 2—2 of FIG. 1, and showing partially, the inside surface of the tailgate and the side wall of the pickup truck.
Figure 3:
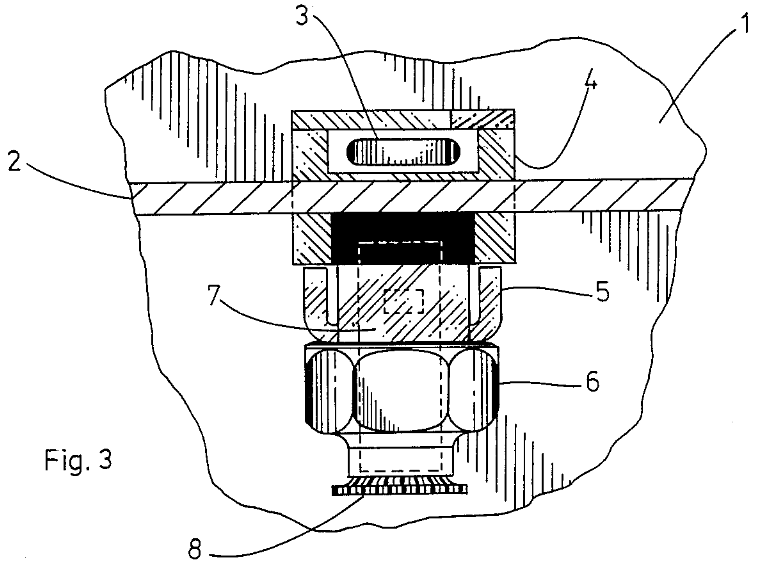
FIG. 3 is an end elevation view of the device, locked in place on the tailgate and side wall, and taken along line 3—3 of FIG. 1.

Referring particularly to the drawings, there is shown in FIGS. 1, 2 and 3 a preferred embodiment of the tailgate locking device, in place on a tailgate 1 and locking the tailgate 1 to the side wall 2 of the pickup truck. The device includes a bolt base assembly 4, a channel clamp 5, a nut-alignment tube 6, a lock plug 7 and a lock protector cap 8.

When affixing the device to the tailgate 1, the bolt base assembly 4 is fitted over the tailgate extension 3, and held against the surface of the tailgate 1. The tailgate 1 is then closed carefully against the ends of the truck side wall 2, and the channel clamp 5 placed over the bolt base assembly 4, so that the bolt 12 protrudes through a first hole 15 in the channel clamp 5. The nut portion of the nut-alignment tube 6 is placed on the threaded bolt 12, and rotated clockwise until the nut tightens flush to the surface of the channel clamp 5, and the alignment tube hole 18 is lined up with a second hole 16 in the channel clamp 5. At this time the channel clamp 5 is exerting pressure against the truck side wall 2, while holding the tailgate 1 tightly through the bolt base assembly 4. A lock plug 7 is then pushed through the alignment tube hole 18 and second hole 16 into the channel clamp 5. Using a key (not shown) in the end of the lock plug 7, the cylinder lock mechanism is rotated so that the lock pin 20 emerges and extends, preventing removal of the lock plug 7. A plastic lock protector cap 8 is fitted over the end of the alignment tube hole 18 to protect the lock plug 7 from moisture and dirt. When fully assembled and in place as depicted in FIGS. 1, 2 and 3, the nut-alignment tube 6 can not be rotated off the channel clamp 5, and the tailgate released unless the lock plug 7 is withdrawn. A locating rod 11, welded on to the bolt base assembly 4, prevents rotation of the channel clamp 5.

First and second protective pads 10 and 14 are attached by adhesive, to the surface of bolt base assembly 4 and the end of channel clamp 5 respectively, to protect the tailgate and truck body surfaces from marring by the tailgate locking device. A third protective pad 19 is also attached by adhesive to the end of the lock plug 7, to protect against inadvertent marring of surfaces.

The action of the device, assembled as described is such that it pulls the tailgate shut against the truck side wall. The device needs to be put on only one end of the tailgate to secure it in place. In the embodiment described and shown in the drawings, advantage is taken of the projecting tailgate extensions 3 at either end of the tailgate, to avoid having to drill bolt holes into the tailgate, with the attendant problems of fastening the locking device securely. The device is also massive, and made of heavy, rigid steel parts, so that it can not be easily cut or broken.

Figure 4A:
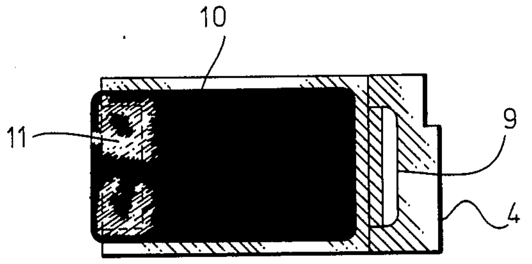
FIGS. 4A, 4B and 4C are respectively, a plan view, a side elevation view and an end elevation view of the bolt base assembly.
Figure 4B:
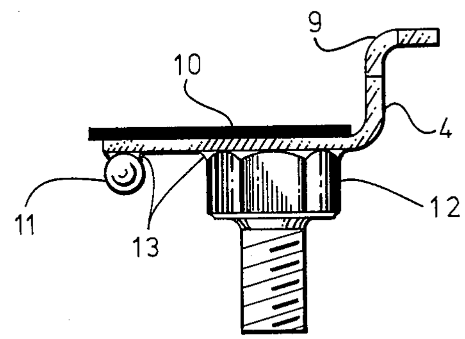
Figure 4C:
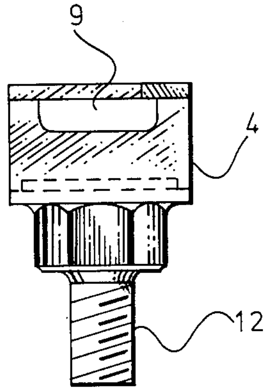

Referring now to FIGS. 4A, 4B and 4C, there are shown three views of the bolt base assembly 4; a plan view, a side elevation view and an end elevation view. Except for the protective pad 10, the assembly could be cast as a single piece, and threads cut on the bolt 12. However, in the present embodiment, a threaded steel bolt 12 and a locating rod 11 are welded 13 perpendicular to the bottom flat surface of the base 4. The base 4 is rectangular shaped, and made of steel approximately 0.100 in. or more thick. One end of the base is bent as shown in the drawing to fit the surface of the end of the tailgate. A first portion is bent or formed, 90 degrees to the plane of the base 4, and then bent so that it is coplanar with the base. A rectangular slot 9 is cut or formed in the vertical 90 degree portion just below its upper bend, to permit clearance for the tailgate extension 3, which is inserted in the slot and used as an anchor fastening. The locating rod 11, which is welded on to the base across its width, is sized to fit the inside width of the channel clamp 5 with some clearance, serving to prevent rotation of the channel clamp 5 with respect to the bolt base assembly 4 when the tailgate locking device is assembled in place. A rectangular shaped first protective pad 10 made of rubber, or a rubber-like material, is attached by an adhesive coating to the top surface of the bolt base assembly 4.

Figure 5A:
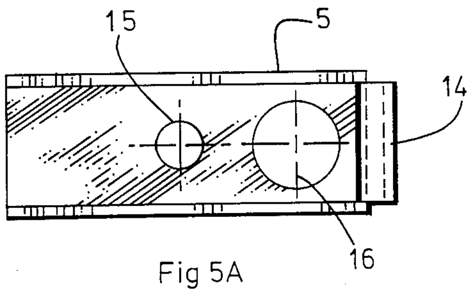
FIGS. 5A and 5B are respectively, a plan view and a side elevation view of the channel clamp.
Figure 5B:
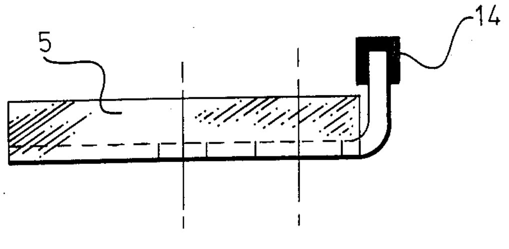

FIGS. 5A and 5B show respectively a plan view and side elevation view of the channel clamp 5. Like the bolt base previously described, the channel clamp is made of sheet steel approximately 0.100 in. or more thick. The channel is formed, of rigid metal having sidewalls of approximately the same height as the bolt 12 head on the bolt base assembly 4. This allows the sidewalls of the channel clamp 5 to press abutting the bottom surface of the bolt base assembly 4. In addition, a first hole 15 and a second hole 16 are cut in the channel clamp base. The first hole 15 is sized and located to provide clearance for the threaded portion of the bolt 12. The second hole 16 is sized and located, to line up with the alignment tube 18 in the nut-alignment tube, when the device is assembled.

Referring again particularly to FIG. 5B, it is seen that a tongue portion of the channel base is extended beyond the channel sidewalls, and is bent upwards at a 90 degree angle to the plane of the channel base. This tongue portion is the agent which transmit the pressure exerted by the channel clamp 5 against the wall of the pickup truck. In order to protect the wall of the pickup truck from being marred by the device, a rectangular shaped second protective pad 14 made of rubber, or a rubber-like material, is attached by an adhesive coating to the protruding edge of the tongue portion.

Figure 6A:
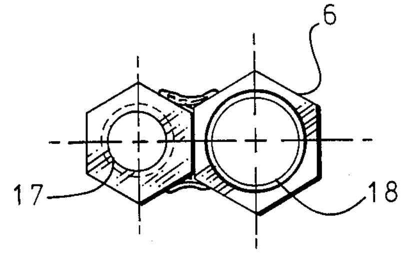
FIGS. 6A and 6B are respectively, a plan view and a side elevation view of the nut-alignment tube.
Figure 6B:
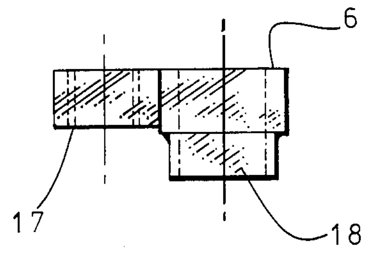

Referring now to FIGS. 6A and 6B, these show respectively, a plan view and a side elevation view of the nut-alignment tube 6. As depicted, the nut-alignment tube comprises a steel nut 17 and a steel alignment tube section 18 welded together. The alignment tube section 18 is stepped into two coaxial sections. The first coaxial section is the same height as the nut thickness, so that it is contiguous with the terminal edge of the nut when welded. The second coaxial section has thinner walls and is concentric with the first section, producing a single tube. When welded together, the threaded hole of the steel nut 17 and the tube of the alignment tube section 18, are located on centers matching the locations of the first hole 15 and second hole 16 in the channel clamp 5.

As an alternative, the nut-alignment tube 6 could be fabricated from a single piece of steel, having the threaded hole tapped, and an alignment tube bored in the appropriate position.

The nut-alignment tube 6 performs the function of enabling tightening of the channel clamp 5 to the bolt base assembly 4, and providing a holder for the lock plug 7, whose presence prevents the threaded nut section from being rotated on the bolt 12 of the bolt base assembly.

Figure 7:
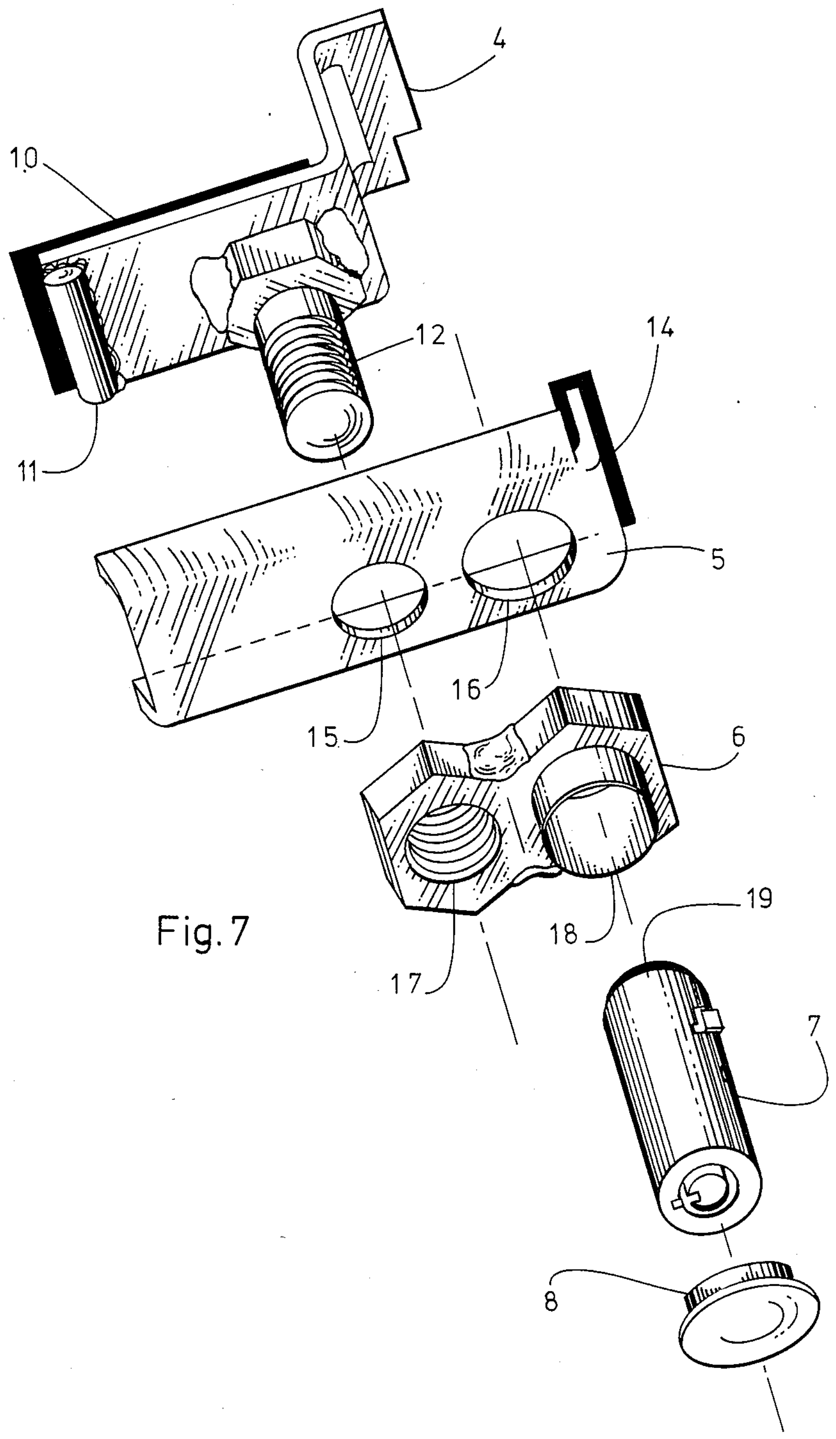
FIG. 7 is an exploded view of the present invention, showing each of its parts.

Referring lastly to FIG. 7, there is shown an exploded view of the device. In this view, the relationship of the bolt 12 to the first hole 15 of the bolt base assembly 5 is shown. The relationship of bolt thread hole 17 and alignment tube hole 18, to the first hole 15 and second hole 16, is also shown. The lock plug 7 which is a cylinder lock, is shown ready to be inserted in the alignment tube hole 18, and a plastic lock protector cap 8 is shown ready to be placed over the end of the alignment tube 18 hole, protecting the lock plug 7.

From the above description, it is apparent that the preferred embodiment achieves the objects of the present invention. Alternative embodiments and various modifications of the embodiments depicted will be apparent from the above description to those skilled in the art. These and other alternatives are considered to be equivalent and within the spirit and scope of the present invention.

Having described the invention, what is claimed is:

1. A locking device for securing the tailgate of a pickup truck and preventing its unauthorized removal, the device comprising:

(a) a bolt base assembly having a base shaped to fit the inside edge of a tailgate belonging to a pickup truck, said bolt base assembly having a rectangular slot cut or formed in the curved portion of its base, enabling it to fit over the tailgate extension and cooperating with said tailgate extension as an anchor fastening for said bolt base assembly, the device is mounted to the tailgate without providing a hole in said tailgate in comprising a base, a threaded steel bolt which is used to attach a channel clamp member, a locating rod and a first protective pad; said bolt base assembly enabling said locking device to hold said tailgate and clamp it firmly against the wall of said pickup truck;

(b) a channel clamp which, when fastened to said bolt base assembly, exerts pressure at one end on the wall of said pickup truck; said channel clamp having a first hole and a second hole drilled or formed in the channel base for the purpose of accommodating said threaded bolt and the lock plug;

(c) a nut-alignment tube comprising a steel nut and an alignment tube section welded together; said nut, when threaded on to said threaded steel bolt projecting from said bolt base assembly, providing the means of fastening said channel clamp to said bolt base assembly; said alignment tube being for the purpose of holding the lock plug; and (d) a lock plug, comprising a cylinder lock and a third protective pad attached by adhesive to one end of said cylinder lock; said lock plug being provided for the purpose of fitting in said alignment tube hole and through said second hold of said channel clamp so that, when said cylinder lock mechanism is rotated by use of a key, a lock pin extends, preventing removal of said lock plug; said lock plug when in position, preventing the rotation of said nut-alignment tube off said threaded steel bolt, thus securing the device and preventing unauthorized removal of said tailgate.

2. The locking device as defined in claim 1 wherein: said bolt base assembly has a base, which is fabricated from steel sheet 0.100 in. or more thick, the head of said threaded steel bolt being welded to the bottom surface of said base so that the threaded bolt portion is perpendicular to the plane of said base; said locating rod being fabricated from steel rod and welded to the bottom surface of said base, across its width; said threaded steel bolt providing a means of attaching said channel clamp to said bolt base; said locating rod serving to prevent rotation of said channel clamp with respect to said bolt base assembly; said first protective pad is rectangular shaped and made of rubber, or a rubber-like material and is attached by an adhesive coating to the top surface of said bolt base assembly, said first protective pad being applied for the purpose of protecting the tailgate from marring by said bolt base assembly.

3. The locking device as defined in claim 2 wherein: the base sheet of said bolt base assembly is extended beyond its threaded bolt attachment, and a first portion bent or formed, 90 degrees to the plane of said base, a second portion being bent so that it is coplanar with said base; said rectangular slot being cut or formed in the vertical 90 degree portion just below its upper bend to permit clearance for said tailgate extension.

4. The locking device as defined in claim 2 wherein: said bolt base assembly alternatively could be cast or formed as a single piece of steel, having threads cut on said threaded bolt, a rectangular slot formed in its base, and a locating rod formed at one end, across its width.

5. The locking device as defined in claim 1 wherein: said channel clamp is fabricated from sheet steel approximately 0.100 in. or more thick, said channel clamp being very rigid; said channel clamp having channel side walls of approximately the same height as the bolt head on said bolt base assembly, allowing said channel clamp side walls to be pressed abutting the bottom surface of said bolt base assembly, preventing rotation and minimizing the shear effect on the locking device when said nut-alignment tube is tightened.

6. The locking device as defined in claim 1 wherein: said nut-alignment tube may be fabricated from a single piece of steel, said nut threaded hole and said alignment tube section being located on centers matching respectively the locations of said first hole and said second hole in said channel base.

7. The locking device as defined in claim 6 wherein: said alignment tube section is stepped into two coaxial sections, a first section being contiguous with the terminal edge of said nut, a second section having thinner walls, concentric with said first section, and extending outward beyond said nut to the end of said threaded bolt.

8. The locking device as defined in claim 5 wherein: said channel clamp has a tongue portion formed in one end, extending beyond the channel side walls, and bent upwards at 90 degrees to the plane of the channel base; said tongue portion provided for the purpose of transmitting the pressure exerted by said channel clamp to the wall of said pickup truck.

* * * * *